June 26, 1945.  C. W. HARRISON  2,379,231
CARGO HANDLING APPARATUS
Filed Oct. 26, 1943  4 Sheets-Sheet 1

INVENTOR
Charles W. Harrison
BY James G. Bethell
ATTORNEY

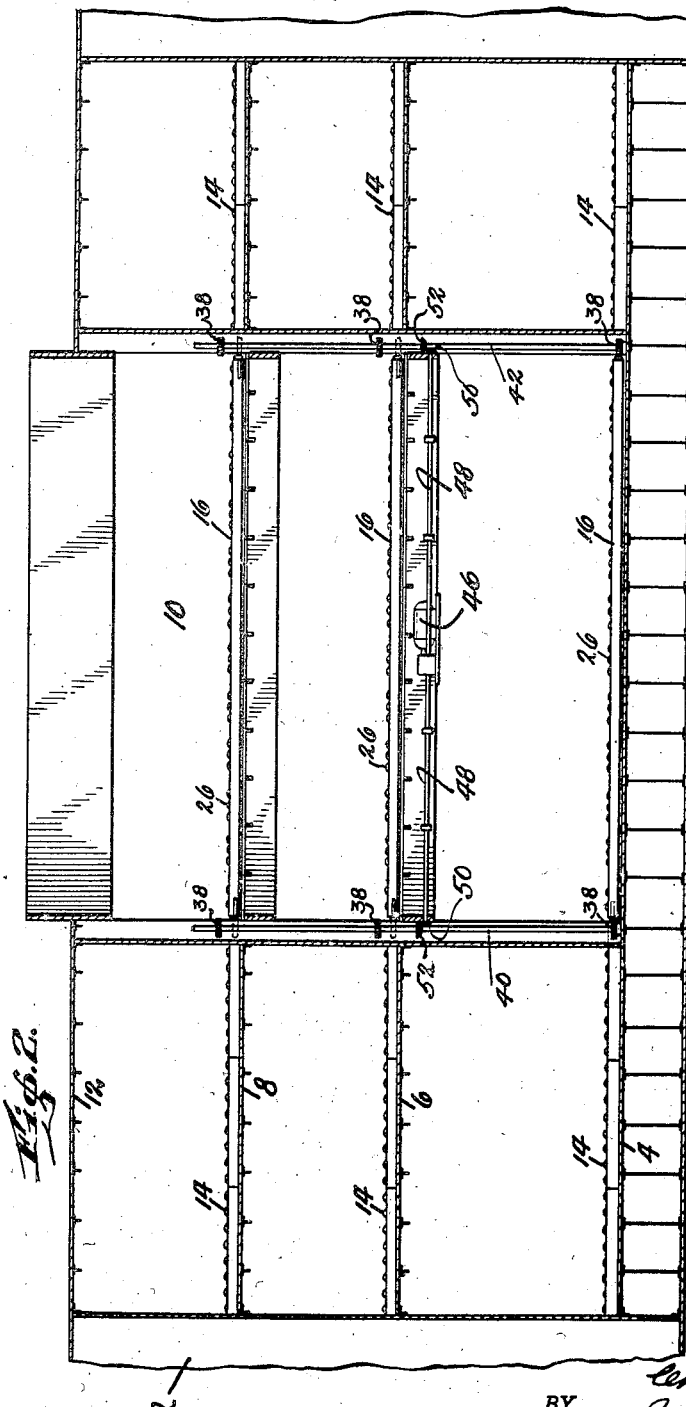

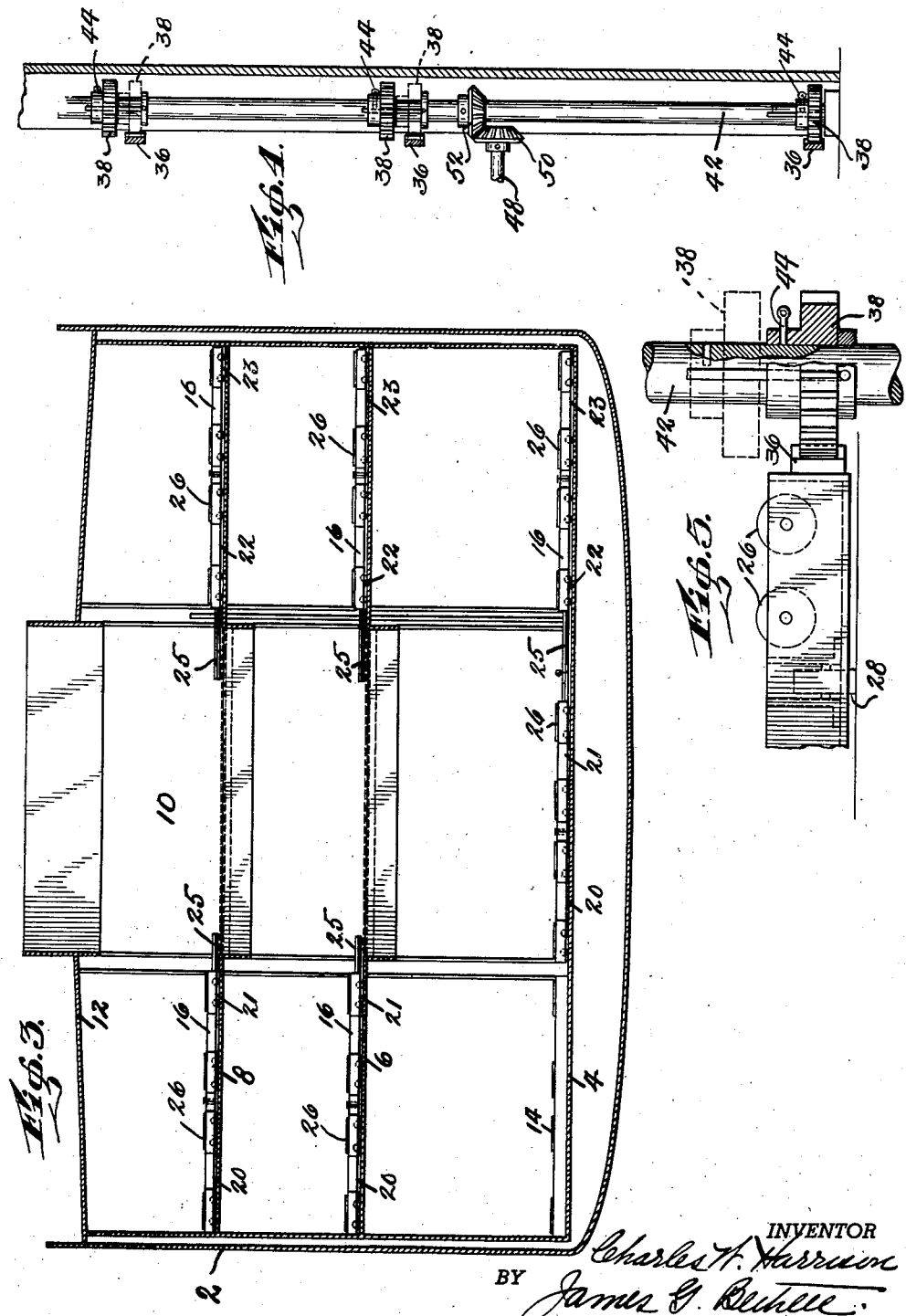

June 26, 1945. C. W. HARRISON 2,379,231
CARGO HANDLING APPARATUS
Filed Oct. 26, 1943 4 Sheets-Sheet 4
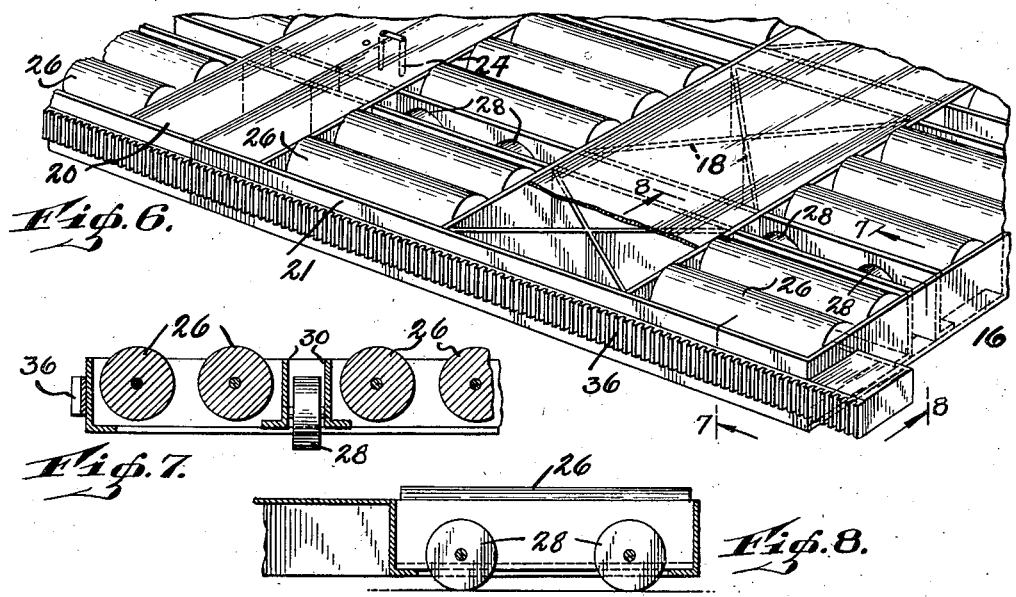
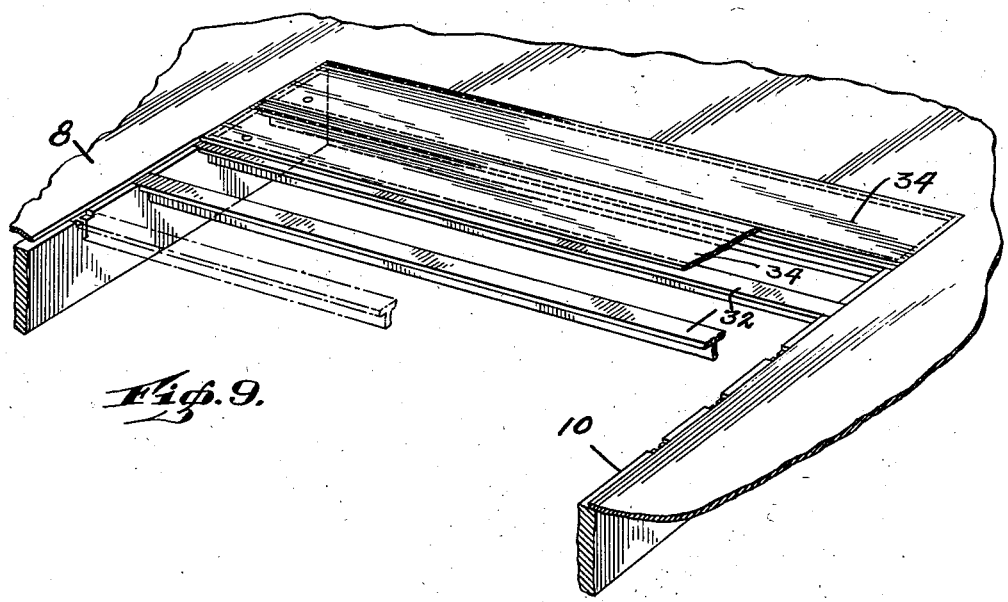
INVENTOR
Charles W. Harrison
BY James G. Bethell
ATTORNEY Patented June 26, 1945

2,379,231

UNITED STATES PATENT OFFICE 2,379,231

CARGO HANDLING APPARATUS

Charles W. Harrison, Bronxville, N. Y., assignor of fifteen per cent to Ava L. Tierney, New York, N. Y.

Application October 26, 1943, Serial No. 507,665

10 Claims. (Cl. 214—15)

My invention relates to the art of transportation, and is particularly directed to an improved apparatus for the loading and unloading of carrier vessels.

One of the objects of my invention is to equip a carrier vessel with apparatus for loading and unloading the same whereby cargo can be stowed much more compactly and with less labor than possible with present equipment. This not only increases the pay load capable of being carried by the vessel but reduces labor costs appreciably. Better stowage of the cargo also facilitates unloading so that a labor saving is effected in the unloading operation as well.

Another object of my invention is to equip the hold of the carrier vessel with permanent conveyor rollers for facilitating movement of the cargo at the various decks of the vessel's hold. These rollers are fixed in position so far as bodily movement is concerned. At each deck level in the hold of the vessel I provide a dolly, which is adapted to be driven parallel to the axes of the conveyor rollers into and out of position with respect to the hatch of the vessel. Each dolly is equipped with rollers upon which the dolly rests, these dolly-supporting rollers being disposed at right angles to the conveyor rollers, so that the dolly can be driven into position beneath a hatch, cargo lowered through the hatch and deposited upon the dolly and then the latter driven to unloading position. The cargo can then be rolled off the dolly upon the conveyor rollers referred to and which are fixed in position and upon which the cargo can be easily pushed by hand into position to be stowed. The dollies are motor driven. One motor only is necessary for driving all dollies and provision is made for driving each dolly independently of the others.

It will be understood from the following detailed description that the arrangement above outlined is provided at each deck level in the hold of the vessel and that the conveyor rollers cover only a part of the deck, so as to provide an opening or lane at each deck level for the movement of the dolly.

In the accompanying drawings wherein I have illustrated an embodiment of my invention:

Fig. 2 is a section on the line 2—2 of Fig. 1, looking in the direction of the arrows thereon;

Fig. 3 is a section at right angles to Fig. 2, taken on the line 3—3 of Fig. 1;

Fig. 4 is an elevational view of part of the dolly-driving mechanism;

Fig. 5 is a part sectional elevational view to show some of the details of the dolly-driving mechanism;

Fig. 6 is a fragmentary view of one of the dollies;

Fig. 7 is a section taken on the line 7—7 of Fig. 6;

Fig. 8 is a section taken on the line 8—8 of Fig. 6; and

Fig. 9 shows the equipment employed for closing over the opening at each deck level beneath the hatch, in the last stage of loading at each deck.

Figure 1:
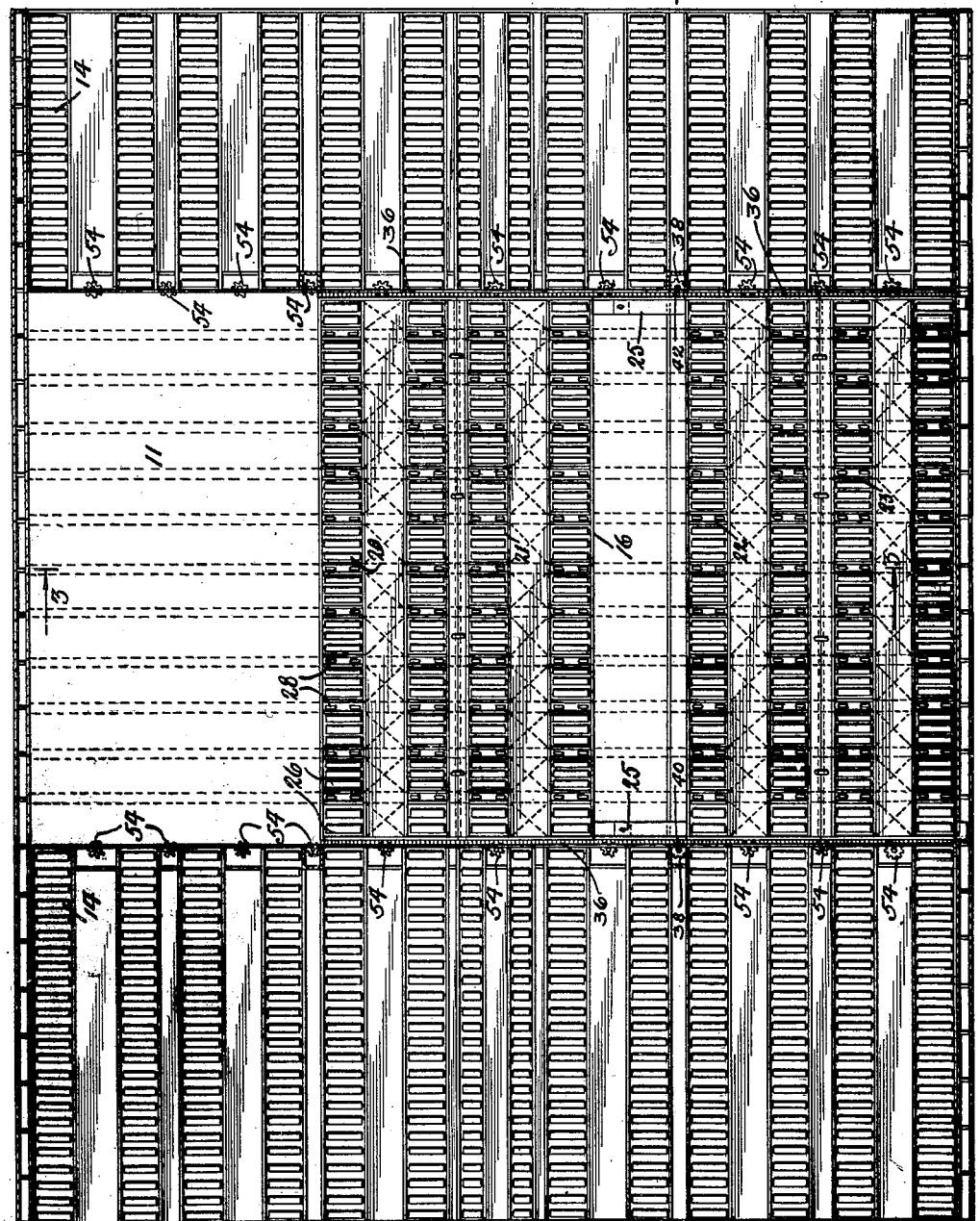
Fig. 1 is a plan view at one deck level of the hold of a carrier vessel.

Referring to the drawings in detail:

2 designates the hull of a cargo vessel, which from Fig. 3 has been shown provided with three cargo decks 4, 6 and 8 in the hold of the vessel.

10 designates the hatch, which as is usual, extends from the upper or main deck 12 to the lowermost cargo deck 4.

At opposite sides of the hatch 10, forward and aft of the hatch, as illustrated, each of the decks 4, 6 and 8 is provided with a system of conveyor rollers 14. These rollers are adapted to rotate about their individual axes but have no bodily movement. In the construction as I have illustrated it, the axis of rotation of each conveyor roller extends crosswise of the hull 2. Inasmuch as this roller system is disposed at each side of the hatch 10, an unobstructed lane 11 is provided at each deck level extending entirely across the hull of the vessel.

At this point I should like to note that the arrangement of the conveyor roller system just described is purely illustrative. It is within the comprehension of my invention to dispose the conveyor rollers at a 90° angle from that shown, in which event, of course, the unobstructed lane 11 above referred to would extend lengthwise of the hull 2 of the vessel instead of crosswise.

As above pointed out, it is one of the objects of my invention to provide an apparatus at each of the decks 4, 6 and 8 upon which cargo can be deposited as it is loaded through the hatch 10, when loading the vessel, and from which this cargo can be readily transferred to the conveyor rollers 14 for stowage.

Referring to this feature of my invention: 16 designates a dolly which I provide at each deck in the vessel's hold. A part of one of these dollies is shown in Fig. 6 and some of the details thereof in Figs. 7 and 8.

Each dolly comprises a rectangular metal framework suitably braced by diagonal metal braces 18. Each dolly is divided transversely, that is, crosswise of its direction of travel, into four sections 20, 21, 22 and 23. The section 20 is connected to 21, and 22 to 23 by removable clips 24, while section 21 is connected to 22 by coupler 25.

Each dolly is provided with cross-pieces to furnish bearings for a plurality of independently rotatable dolly rollers 26 with which each dolly is equipped. The axes of rotation of these dolly rollers are parallel to the axes of the conveyor rollers 14.

Each dolly is adapted to be driven along the lane 11 transversely of the vessel's hull, as illustrated, that is to say, parallel to the axes of the conveyor rollers 14. Accordingly each dolly is provided with supporting rollers 28 resting upon the several decks 4, 6 and 8. The axes of rotation of these supporting rollers are at right angles to those of the rollers 26. The bearings for these rollers 28 are in beams or stringers 30 with which each dolly is equipped. It will be appreciated that the rollers 28 extend slightly below the plane of the bottom of each dolly into contact with a deck so that the dolly is supported and can be driven bodily along the lane 11.

In Fig. 9 I have shown a construction which I employ at the hatch at decks 6 and 8. This construction is provided to permit the dollies to be rolled from one side of the vessel to the other, and comprises removable girders 32 let into the sides of the hatch and covered with removable steel plates 34. This provides removable flooring at the hatch at decks 6 and 8. The lower deck 4 of course is permanently floored at the hatch as is usual.

It will be appreciated, of course, that the conveyor rollers 14 and the dollies are so dimensioned that the upper surfaces of the same are flush with each other in all positions of the dollies and cargo may be readily rolled off the dollies upon the conveyor rollers and vice versa.

The dollies are motor driven, and with my construction only one driving motor is required. As will be seen from the drawings the opposite sides or edges of each dolly are provided with a rack 36. Engaging the teeth of these racks are positively driven gears 38. There are two of these gears at each of the decks 4, 6 and 8, one at each side of a dolly. One set of these gears, that is, the gears 38 for one side of each of the three dollies is mounted on a shaft 40, extending vertically from the lower deck 4 to a short distance above the deck 8. The other set of gears 38 is disposed upon a similar shaft 42 at the opposite side of the dollies. These shafts, it will be appreciated and as seen from Fig. 1, are slightly to one side of the hatch so as to be out of the path of the dollies.

Upon reference to Figs. 4 and 5 it will be seen that each of the gears 38 is keyed to its respective shaft 40 or 42, but is adapted to be moved vertically thereof out of engagement with the teeth of the racks 36. The gears are held in this disengaged position by pins 44.

The driving motor for the dollies is designated 46 and may be mounted just outside the boundaries of the hatch at deck 6, for example, and slightly below the deck level so as not to interfere with the movement of the dolly at that deck. Shafts 48 are driven by this motor through suitable reduction gearing, these shafts extending in opposite directions toward the vertical drive shafts 40 and 42. At the outer end of each of the shafts 48 is a gear 50 meshing with a gear 52 rigidly secured to shafts 40 and 42. The gears 50 and 52 are always in mesh so that shafts 40 and 42 are always driven together and at the same speed.

The sliding gear arrangement with respect to the gears 38, however, permits of operation of but one dolly at a time. For example, as illustrated in Fig. 4, the two upper gear sets 38 have been disengaged from the racks of the two upper dollies, while the lower gear set has been left in operative position, so that under these conditions the lowermost dolly of all will be actuated.

The arrangement just described, therefore, provides for the positive independent selective operation or propulsion of a plurality of dollies at different levels by the one driving motor. The racks 36 are of such length as never to be out of engagement with the driving or propulsion gears 38. However, for guiding purposes and to prevent any twisting of a dolly as the same is being actuated, I provide a series of idler gears 54 adjacent the inner terminals of the conveyor roller structure and in position to be in constant mesh with the dolly racks 36.

From all of the foregoing it will be seen that at each of the cargo decks 4, 6 and 8 I provide a fixed conveyor roller structure extending completely across the vessel's hull. It will be seen also that this structure terminates at the sides of the hatch so that directly in register with the hatch I have a space or lane at each deck level into which this conveyor roller system does not extend, this space extending the width of the vessel's hull.

It will be appreciated also that in this lane, at each deck, I provide a dolly which, as above explained, is positively driven, when in operation, crosswise of the vessel's hull.

I shall now describe the operation of my equipment with respect to the loading of cargo at one deck level. Inasmuch as Fig. 4 shows the lowermost dolly-driving gears 38 in operative position, and Fig. 3 the dolly at deck 4 in cargo receiving position, let it be assumed that cargo is to be loaded between decks 4 and 6. It will be seen from Fig. 3 that the dolly at each deck is of such a length that when in its extreme position at one side or the other of the vessel's hull, the trailing portion of the dolly will be beneath the hatch 10.

Referring now, for example, to Figs. 1 and 3: The dolly at deck 4 is shown in one of its extreme positions and its trailing end lies beneath the hatch 10 ready to receive cargo. Under these conditions the two halves of the dollies at decks 6 and 8 have been uncoupled, so that one-half of each dolly is at one side of the hatch and the other half-dolly at the other side of the hatch leaving the hatch clear for lowering cargo to the dolly at deck 4. Cargo accordingly is lowered through the hatch and deposited on that part of the dolly directly beneath, whereupon the motor 46 is started up and the dolly driven to the opposite side of the hull from that illustrated. This brings the empty end of the dolly beneath the hatch and the loaded end into unloading position. At this stage, therefore, one-half of the dolly is being unloaded while the other half is being loaded. By reason of the provision of the dolly rollers 26 and the conveyor rollers 14, it will be evident that the cargo on the loaded end of the dolly may be readily stowed. On the next operation the direction of travel of the dolly is reversed. These operations are continued until the hold is loaded except for the lane 11 in which the dolly travels. One end of the dolly is then fully loaded, the dolly actuated to either of the extreme positions, and then one-half section disconnected at the coupling 25 and left in this position permanently. Meanwhile the other half of the dolly has been loaded and this half is then actuated to extreme position at the opposite side of the hull from the first section. The only part of the hold which is left unloaded between decks 4 and 6 is directly in line with the hatch. Cargo is now stored in this space up to deck level 6.

At decks 6 and 8 the dolly sections have been separated as above pointed out so that one section is at one side of the hull and the other section at the opposite side, as illustrated in Fig. 3. The next procedure is to place the girders 32 and plates 34 at deck 6 in position. The lowermost gears 38 are then moved up the shafts 40 and 42 out of mesh with the rack on the dolly at deck 4, and the gears 38 at deck 6 moved into engagement with the racks of the dolly at that deck. One dolly section is then driven by the motor 46 into position to couple this section to the companion dolly section. Loading then proceeds as described in connection with the loading at deck 4, and the dolly sections are returned finally to their initial positions, but loaded, leaving an unloaded space directly beneath the hatch opening. This space has been floored over by the sheets 34, as above pointed out, so that this space may now be loaded up to deck level 8, after which the space at this level may be loaded in the same fashion.

It will be evident from all of the foregoing that I have provided a construction whereby a carrier vessel may be loaded with general cargo with the maximum speed and with the minimum of labor.

It will be understood, furthermore, that inasmuch as the dollies are roller mounted they are adapted to carry tremendous loads, and inasmuch as each dolly is equipped with rollers disposed parallel to the conveyor rollers at each deck very heavy articles can be stowed with ease and with the minimum of effort.

It will be appreciated also that only one motor is required to drive the dollies, the motor and the drive for the dollies being so constructed and arranged that any dolly or dolly section can be driven at will independently of all the others. It will be understood, of course, that the control for the motor may be located wherever found convenient.

It will be appreciated, furthermore, that by building the dollies to the size described, so far as concerns the dimensions of the hatch, cargo loading and stowing are carried out simultaneously, and practically continuously, in that cargo can be loaded upon one portion of a dolly while being unloaded and stowed from another portion of the dolly. The only necessary stoppage of operation is when a dolly is being driven from one extreme position to the other.

As pointed out hereinbefore, I have elected to show the roller arrangements as illustrated purely for purposes of description. If desired the lane 11 for the dollies could extend lengthwise instead of crosswise of the hull, in which event the rollers 14 and 26 would be shifted through a 90° angle so as to parallel the direction of travel of the dollies.

I wish it to be understood that changes may be made in the details of construction herein illustrated and described within the purview of my invention.

What I claim is:

1. A carrier vessel having a hatch, conveyor rollers disposed in fixed position in the hold of said vessel at opposed sides of the hatch, to provide a lane extending from one wall of the hold to the other, and passing beneath the said hatch, a dolly in said lane, and a rack and pinion drive for driving the dolly along said lane, said dolly being of such dimensions that when at either limit of travel the dolly will overlap said hatch to provide for unloading a portion of the dolly through the hatch while another portion is being unloaded upon said conveyor rollers.

2. A carrier vessel having a hatch, conveyor rollers disposed in the hold of said vessel at opposed sides of the hatch, to provide a lane extending from one wall of the hold to the other beneath the hatch, a dolly in said lane, a rack and pinion drive for driving the dolly along said lane, and guide gears meshing with the rack of said drive for guiding the dolly throughout said movement, said dolly being of such dimensions that when at either limit of travel the dolly will overlap said hatch, to provide for loading a portion of the dolly through the hatch while another portion is being unloaded upon said conveyor rollers.

3. A carrier vessel having a hatch and a series of cargo carrying decks in the hold of the vessel, each deck being accessible for the loading and unloading of cargo through said hatch, conveyor rollers disposed upon each of said decks, at opposed sides of the hatch, to provide a lane extending from one wall of the hold to the other, a dolly for each lane provided with rollers adapted to cooperate with said conveyor rollers for the loading and unloading of cargo, and a single driving motor adapted for the independent driving of said dollies along their respective lanes.

4. A carrier vessel having a hatch and a series of cargo carrying decks in the hold of the vessel, each deck being accessible for the loading and unloading of cargo through said hatch, conveyor rollers disposed upon each of said decks, at opposed sides of the hatch, to provide a lane extending from one wall of the hold to the other, a dolly for each lane provided with rollers adapted to cooperate with said conveyor rollers for the loading and unloading of cargo, a single driving motor, and selective gearing driven thereby whereby any one of said dollies can be positively driven along its lane independently of the others.

5. A carrier vessel having a hatch and a series of cargo carrying decks in the hold of the vessel, each deck being accessible for the loading and unloading of cargo through said hatch, conveyor rollers disposed upon each of said decks, at opposed sides of the hatch, to provide a lane extending from one wall of the hold to the other, a dolly for each lane provided with rollers adapted to cooperate with said conveyor rollers for the loading and unloading of cargo, racks carried by each of said dollies, a drive shaft extending vertically of the vessel's hold at each side of said dollies, a single motor for driving said shafts, and gears carried by said shafts and adapted to be thrown individually into and out of mesh with the racks of the several dollies, whereby any dolly may be positively driven independently of the other dollies.

6. A carrier vessel having a hatch and a plurality of cargo carrying decks in the hold of the vessel, each deck being accessible for the loading and unloading of cargo through said hatch, conveyor rollers disposed upon each of said decks, at opposed sides of the hatch, to provide a lane extending from one wall of the hold to the other, said conveyor rollers being disposed in parallel relation to each other with their axes parallel to the long axis of the lane, a dolly for each lane adapted to be rolled along said lane upon their respective decks, rollers carried by each dolly extending in the direction of movement of the dollies for cooperation with said conveyor rollers, racks carried by each of said dollies, gears for selective engagement with said racks, a single motor for driving said gears, said driven gears being so disposed with respect to the dollies and said racks being so dimensioned that in all positions of any of said dollies a selected dolly may be positively driven along the said lane.

7. A carrier vessel having a hatch and a plurality of cargo carrying decks in the hold of the vessel, each deck being accessible for the loading and unloading of cargo through said hatch, conveyor rollers disposed upon each of said decks at opposed sides of the hatch to provide a lane extending from one wall of the hold to the other, a dolly in each lane provided with rollers for cooperation with the conveyor rollers, a single motor for driving said dollies, selective gearing between the motor and dollies, whereby any dolly may be driven by said motor independently of the others, each dolly being made in separable sections, whereby any one dolly may be driven to one extremity of its lane and a section uncoupled and the other section driven to the other extremity of its lane.

8. A carrier vessel having a hatch and a series of cargo carrying decks in the hold of the vessel, each deck being accessible for the loading and unloading of cargo through said hatch, conveyor rollers disposed upon each of said decks, at opposed sides of the hatch, to provide a lane extending from one wall of the hold to the other, a dolly for each lane provided with rollers adapted to cooperate with said conveyor rollers for the loading and unloading of cargo, a single driving motor, and selective gearing driven thereby whereby any one of said dollies can be positively driven along its lane independently of the others, each dolly being of such dimensions that when at either extremity of its lane a portion of the dolly will be in line with said hatch, whereby cargo can be moved from part of the dolly upon said conveyor rollers, while another part of the dolly is being loaded through said hatch.

9. A carrier vessel having a hatch and a series of cargo carrying decks in the hold of the vessel, each deck being accessible for the loading and unloading of cargo through said hatch, conveyor rollers disposed upon each of said decks, at opposed sides of the hatch, to provide a lane extending from one wall of the hold to the other, a dolly for each lane provided with rollers adapted to cooperate with said conveyor rollers for the loading and unloading of cargo, racks carried by each of said dollies, a drive shaft extending vertically of the vessel's hold at each side of said dollies, a single motor for driving said shafts, and gears carried by said shafts and adapted to be thrown individually into and out of mesh with the racks of the several dollies, whereby any dolly may be positively driven independently of the other dollies, each dolly being of such dimensions that when at either extremity of its lane cargo may be moved therefrom upon said conveyor rollers, and at the same time additional cargo may be loaded upon another portion of the dolly through said hatch.

10. A carrier vessel having a hatch and a plurality of cargo carrying decks in the hold of the vessel, each deck being accessible for the loading and unloading of cargo through said hatch, conveyor rollers disposed upon each of said decks at opposed sides of the hatch to provide a lane extending from one wall of the hold to the other, a dolly in each lane provided with rollers for cooperation with the conveyor rollers, a single motor for driving said dollies, selective gearing between the motor and dollies, whereby any dolly may be driven by said motor independently of the others, each dolly being made in separable sections, whereby any one dolly may be driven to one extremity of its lane and a section uncoupled and the other section driven to the other extremity of its lane and of such dimensions that with the sections coupled and the dolly at either extremity of its lane, a portion of the dolly will be beneath the hatch to permit cargo to be moved from the dolly upon the conveyor rollers, while more cargo is being loaded upon the dolly through said hatch.

CHARLES W. HARRISON.